United States Patent [19]
Rotter et al.

[11] 3,959,815

[45] May 25, 1976

[54] ARRANGEMENTS FOR TIME BASE ERROR COMPENSATION

[75] Inventors: Gerhard Rotter, Mission Viejo; William A. Buchan, Newport Beach; Rainer an der Heiden, Anaheim, all of Calif.

[73] Assignee: BASF Aktiengesellschaft, Ludwigshafen (Rhine), Germany

[22] Filed: Jan. 28, 1974

[21] Appl. No.: 437,285

[52] U.S. Cl. .................. 360/36; 360/70; 360/73
[51] Int. Cl.² .................. H04N 5/795; G11B 15/54
[58] Field of Search .............. 360/36, 26, 51, 70, 360/73; 178/69.5 TV, 69.5 F, 69.5 DC, 5.4 CD; 179/15 BS; 358/8

[56] References Cited
UNITED STATES PATENTS

| | | | |
|---|---|---|---|
| 3,141,926 | 6/1964 | Newell | 360/36 |
| 3,210,464 | 10/1965 | Felgel-FarnHolz | 360/36 |
| 3,347,997 | 10/1967 | Woodruff | 360/36 |
| 3,580,991 | 5/1971 | Krause | 360/36 |
| 3,594,498 | 7/1971 | Smith | 360/36 |
| 3,654,398 | 4/1972 | Louth | 360/70 |

*Primary Examiner*—Raymond F. Cardillo, Jr.
*Attorney, Agent, or Firm*—Johnston, Keil, Thompson & Shurtleff

[57] ABSTRACT

This invention relates to methods or circuit arrangements for compensating time base error in recording systems, particularly video recording systems, by electro-mechanical and electronic means. The circuit arrangements provide for separation of the horizontal synchronizing pulses from the video information contained in a signal coming from a recorded video tape, comparison of the phase of these horizontal synchronizing pulses to the phase of a reference pulse, and adjustment of the frequency of the horizontal synchronizing pulses which go to the video receiver to eliminate time base error.

6 Claims, 6 Drawing Figures

ARRANGEMENTS FOR TIME BASE ERROR COMPENSATION

BACKGROUND OF THE INVENTION

Video signals as braodcast by television transmitting stations contain horizontal synchronizing pulses at predetermined and highly accurate time intervals with video information contained between these pulses. These horizontal synchronizing pulses trigger the horizontal sweep circuit of the video receiver. It is possible to record the incoming video information including both horizontal synchronizing pulses and the video picture information on magnetic tape. However, after the incoming video information is recorded on the tape and it is desired to then play back the video tape, the horizontal synchronizing pulses do not always appear at the precise predetermined time at which they occurred when the video signal was broadcast. This variation of the horizontal synchronizing pulses from the time in which they should appear is called time base error, and it may be of the order of several microseconds.

Time base error in a video recording system results from variations in the video tape tension during recording and playback, irregularities in the operation of the tape drive transport elements, and from other causes. Time base error from various sources occurs at certain frequencies and harmonics thereof. It is necessary to correct for the time base error of a tape recorded video program in order to achieve satisfactory receiver performance on playback. This is especially true where the tape was recorded on another video recorder than the one on which playback is accomplished. The result of time base error in a video picture, as seen on the video receiver, is that vertical lines will become wavy or discontinuous.

Expensive professional video recorders utilize a long signal delay line having multiple physical taps at which the signal can be removed. The video signal is removed at the tap which just corrects for time base error. Less expensive recorders which are commercially available use 1 inch wide recording tape which has the video program recorded diagonally across the longitudinal direction of the tape by two magentic transducer heads. These recorders require two drive servo systems, one to drive the tape and a second to drive the rotary mount for the two transducer heads. In these systems, time base error results because of inherent differences between the two transducers, and it is not adequately compensated for in present systems.

A German Patent No. 2,122,592 has described a time base error correction system; however, the present invention has several advantages over the German patent which would not be obvious to those skilled in the art. German Patent No. 2,122,592 uses a feed-forward system to regulate the horizontal synchronizing pulse time to reduce time base error. The present invention, in all embodiments, uses a feedback system which has been found to be more stable. Secondly, in the German patent, a reference signal goes directly to the tape drive motor, where as in the present invention, the video signal is first compared to a reference signal and the resulting phase difference is used to control the tape drive motor's angular speed of rotation. This has again been found to be a more stable technique of correcting for time base error.

The German patent develops the control signal for a bucket brigade by the subtraction of a multiple of the signal frequency from a reference frequency. This method does not correct for constant time base error bias or for very slowly varying time base error. The present invention develops a signal to correct for time base error by comparing the phase of the video signal to a reference signal and using only the phase difference in the correction circuit; therefore, constant time base error bias or very slowly varying time base error can be corrected.

SUMMARY OF THE INVENTION

In this invention two methods or techniques of correcting time base error are disclosed. One consists of an electro-mechanical servo system where the horizontal synchronizing signal taken from the video tape is locked to a reference frequency. This technique provides for taking the total video signal as recorded on the tape, passing it through a circuit (a sync stripper) to isolate the horizontal synchronize pulses from the balance of the signal and then passing this signal into a phase-detecting circuit. This phase-detecting circuit compares the horizontal synchronizing signal from the tape with a reference signal, and depending on the phase of the compared signal, the motor drive of the tape is increased in velocity or decreased in velocity in order to correct for the time base error. A second technique involves taking the video signal from the tape, passing it through an electronic delay line such as a bucket brigade, then stripping the horizontal synchronizing pulse from the video information by a sync stripper and again passing this into a phase detecting circuit. This signal is compared with a reference signal, and the difference in phase generates a voltage which is fed to a voltage controlled oscillator. The output of the voltage controlled oscillator controls the operation of the bucket brigade to either slow down or speed up the transition of the bucket brigade by the video signal.

An object of this invention is to provide circuit arrangements affording compensation for time base error in a video tape recorder system which uses only one magnetic transducer head.

A further object of the invention is to correct for all time base error so as to maintain a more stable picture during playback than other non-professional video recorders while maintaining the cost of the system at an advantageous level.

Other objects of the invention will be obvious to those skilled in the art from the description of the preferred embodiments.

DESCRIPTION OF THE PREFERRED EMBODIMENTS

Figure 1:
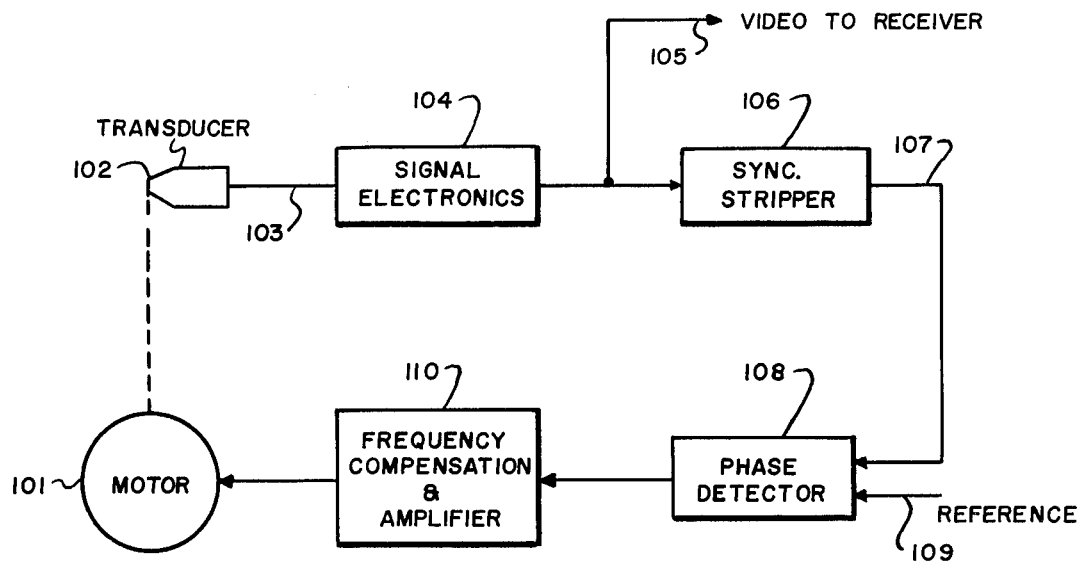
FIG. 1 is an electro-mechanical method of reducing time base error.
Figure 2:
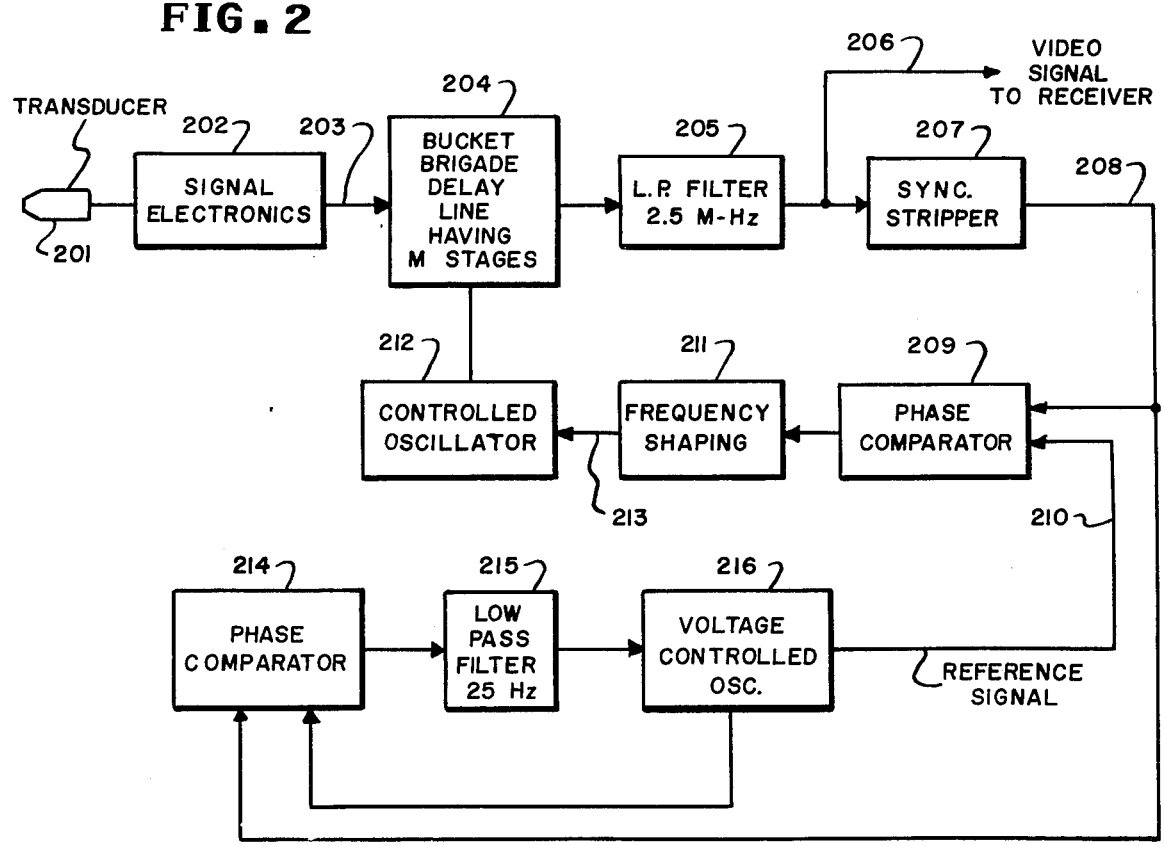
FIG. 2 is an electronic time base error correction circuit using a bucket brigade.

As shown in FIG. 1, the motor 101 drives the magnetic tape past transducer 102 resulting in the pick up of video signal 103. This video signal is modified by the signal electronics 104 and passed to the video receiver as signal 105. It also is passed to the sync stripper 106 where the horizontal synchronizing pulses are separated from the balance of the video information. This results in an output from sync stripper 106 of only the horizontal synchronizing pulses 107 which is then passed to a phase detector 108. A reference signal 109 from, for example, a crystal controlled oscillator, is also introduced into the phase detector 108. These two signals are compared by the phase detector 108 and a difference signal is supplied to the frequency compensation and amplifier network 110. This circuit 110 controls motor 101. If the phase of the horizontal synchronizing pulses 107 leads the phase of the reference pulses 109 the motor would be reduced in speed to compensate for this difference. If, on the other hand, the phase of the pulses 107 lags the reference pulses 109 the angular velocity of the motor 101 would increase to correct for the phase difference and reduce it to zero. This results in the reduction of time base error having frequencies within the bandwidth of the servo system (i.e., in the present system, time base error having a frequency of zero to 80 Hz). Where time base error frequency is outside the electro-mechanical servo bandwidth, e.g., in the range of 80 to 2500 Hz, it is advantageous to utilize another embodiment of this invention. That embodiment is the electronic delay circuit shown in FIG. 2.

In this circuit, video information recorded on the tape is picked up by transducer 201. The signal developed is passed through signal electronics 202 producing signal 203 which is presented to a time delay time which in this embodiment is a bucket brigade 204 having M stages. For instance, these bucket brigades may consist of a series of electronic switches and capacitors which are so arranged as to pass a charge from one capacitor through an electronic switch to the next capacitor at a rate which is determined by the frequency at which the electronic switches are activated. Special kinds of bucket brigades have recently been developed using charge coupled devices and such a device also performs the delay function in this invention. Where the bucket brigade has M stages and the switching rate is some frequency $f_s$, the time for a signal to propagate through the bucket brigade will be determined by the equation:

$$T_{prop.} = \frac{M}{f_s} \qquad (1)$$

Therefore, by varying the switching frequency, the extent of the delay in the propagation of the signal can be varied inversely to the switching frequency $f_s$. The output of the last stage of the bucket brigade is filtered by low pass filter 205 to remove high frequency switching disturbances. The video signal to the video receiver is taken off at point 206. The video signal is passed into synch stripper 207 of the feedback loop where the horizontal synchronizing pulses are separated from the balance of the video information producing wave form 208. The output 208 is then passed into a phase detector 209 where it is compared with a video reference pulse frequency 210 to obtain the phase difference between the two frequencies. This reference frequency is obtained from a phase-locked oscillator with a very low bandwidth, so that the oscillator frequency becomes the average of the horizontal sync frequency off-tape, but does not contain the flutter components contained in the frequency off-tape. This phase-locked oscillator comprises phase comparator 214, a 25 Hz low pass filter 215 and voltage controlled oscillator 216. The phase difference information at the output of phase comparator 209 is conditioned by the frequency compensating electronics 211 and then introduced into a voltage controlled oscillator 212 as a voltage signal 213 whose polarity depends on the phase difference between signals 208 and 210. The output of the voltage controlled oscillator 212 is then used to trigger the electronic switches of bucket brigade 204. Therefore, where signal 208 leads the video reference signal 210, a voltage will be generated by the phase comparator 209 which will cause the voltage controlled oscillator 212 to vary its oscillations in such a manner as to reduce the triggering frequency of the electronic switches of the bucket brigade 204 thereby reducing the phase difference between the signal 208 and the reference signal 210. Therefore, the time base error of video signal 203 is corrected.

It is apparent that the switching frequency $f_s$ varies depending upon the degree of time base error. If reasonable switching speeds are assumed, for example $f_{s1}$ of 12 mega-Hertz as a maximum and $f_{s2}$ of 6 mega-Hertz as a minimum, and the time base error is assumed to be 20 microseconds, the following equation results:

$$T_{prop.} = \frac{M}{f_s} = M \left[ \frac{1}{f_{s2}} - \frac{1}{f_{s1}} \right] \qquad (2)$$

Substituting values:

$$20 \, \mu \, \text{sec} = M \left[ \frac{1}{6} - \frac{1}{12} \right]$$

$$20 \, \mu \, \text{sec.} = \frac{M}{12}$$

$$M = 20 \, \mu \, \text{sec} \times 12 = 240 \, \text{stages}$$

From the above calculations, it is apparent that, with the values assumed, a bucket brigade of 240 stages would be necessary to correct for a 20 microsecond time base error. Such a number of stages is possible; however, by incorporation of an electro-mechanical time base error correction system in conjunction with an electronic time base error correction method as shown in the third embodiment in FIG. 3, a bucket brigade of fewer stages can be utilized. In addition, since the electro-mechanical loop in FIG. 3 locks the sync frequency to the reference frequency it is not necessary to use a separate phase-locked oscillator to derive the bucket brigade sync frequency.

Figure 3:
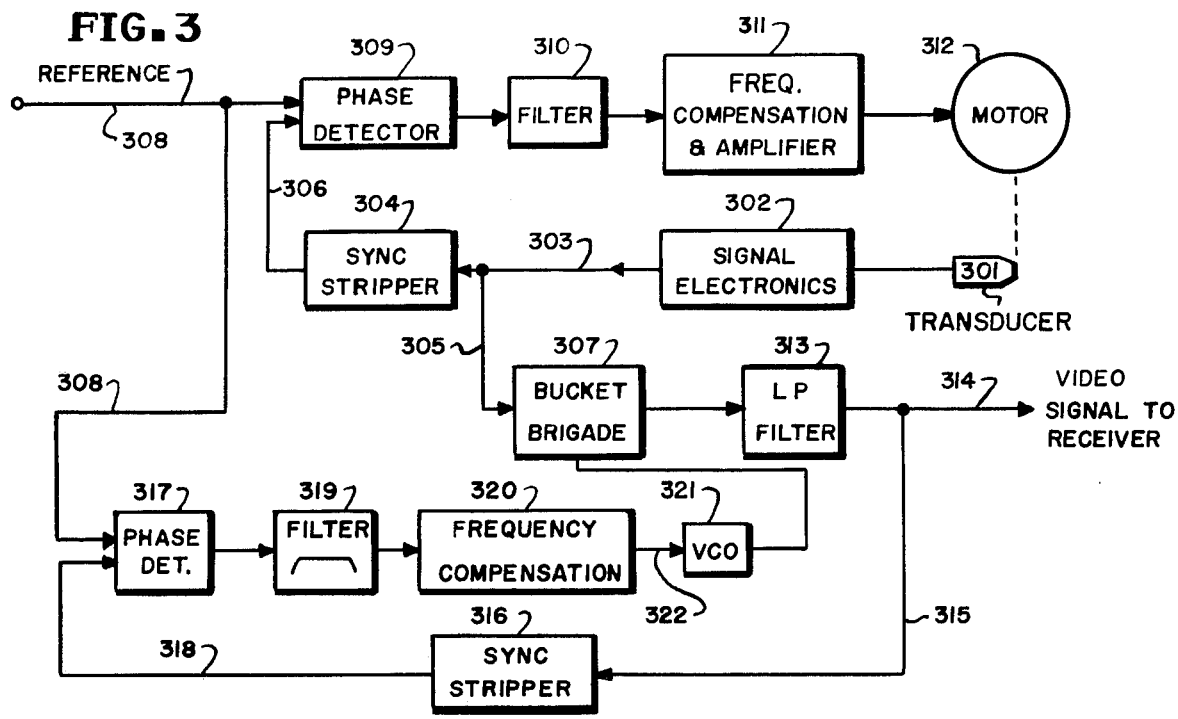
FIG. 3 is an embodiment of the invention using both electro-mechanical and electronic time base error reducing means.

In FIG. 3 a transducer 301 receives the signal from the magnetic tape and passes it into signal electronics 302. The video signal 303 is the presented to sync stripper 304. Sync pulse signal 306 is generated by the sync stripper 304 by separating the horizontal synchronizing pulses from the video information. This signal 306 is the passed to the phase detector 309 where it is compared with reference signal 308. The phase differential between signals 306 and 308 is then filtered by low pass filter 310 and presented to frequency compensation and amplifying circuit 311 where it causes the tape drive motor 312 to increase or decrease in speed to compensate for time base error. This portion of the circuit is specifically adjusted so as to only allow it to compensate for low frequency time base error, i.e. time base error resulting at a frequency of 0 to 80 Hz. High frequency time base error, i.e., time base error having frequencies between approximately 80 Hz and 2,500, is compensated for by the balance of the circuit shown in FIG. 3. The magnitude of the high frequency time base error is approximately plus or minus 1 microsecond; therefore, a bucket brigade having only 24 stages (M = 2 microseconds × 12 mega − Hz = 24 stages) can be utilized to correct for this time base error.

Signal 305 is presented to bucket brigade 307. The output of bucket brigade 307 is passed into a low pass filter 313 which removes switching disturbances. The signal goes to the video receiver through line 314. The feedback signal 315 is passed through a second sync stripper 316 and into a second phase detector 317 as signal 318 along with reference signal 308. The output of the phase detector is filtered by filter 319 which passes time base error having frequencies between approximately 5 Hz to 2,500 Hz. Since the first portion of the circuit removes most of the time base error up to 80 Hz, the remaining time base error will be mainly in the range of 80 Hz to 2,500 Hz. Nevertheless, the remaining time base error in the lower frequency range will also be reduced by the bucket brigade circuit. The cut-off at 5 Hz is necessary to ensure that any steady stage phase offset between reference 308 and signal 318 does not drive the bucket brigade 307 to its limit. The filtered signal from filter 319 is acted upon by the frequency compensation circuit 320 and then passed, as signal 322, into the voltage controlled oscillator 321, the output of which is used to trigger the switching of the electronic switches of the bucket brigade delay line 307. It is apparent that as the phase differential between the signal 318 coming from sync stripper 316 differs from the reference signal 308 as presented to the phase detector 317, the circuit will cause the bucket brigade 307 to either increase or decrease the delay time of the signal across bucket brigade 307 and, therefore, correct for time base error.

Figure 4:
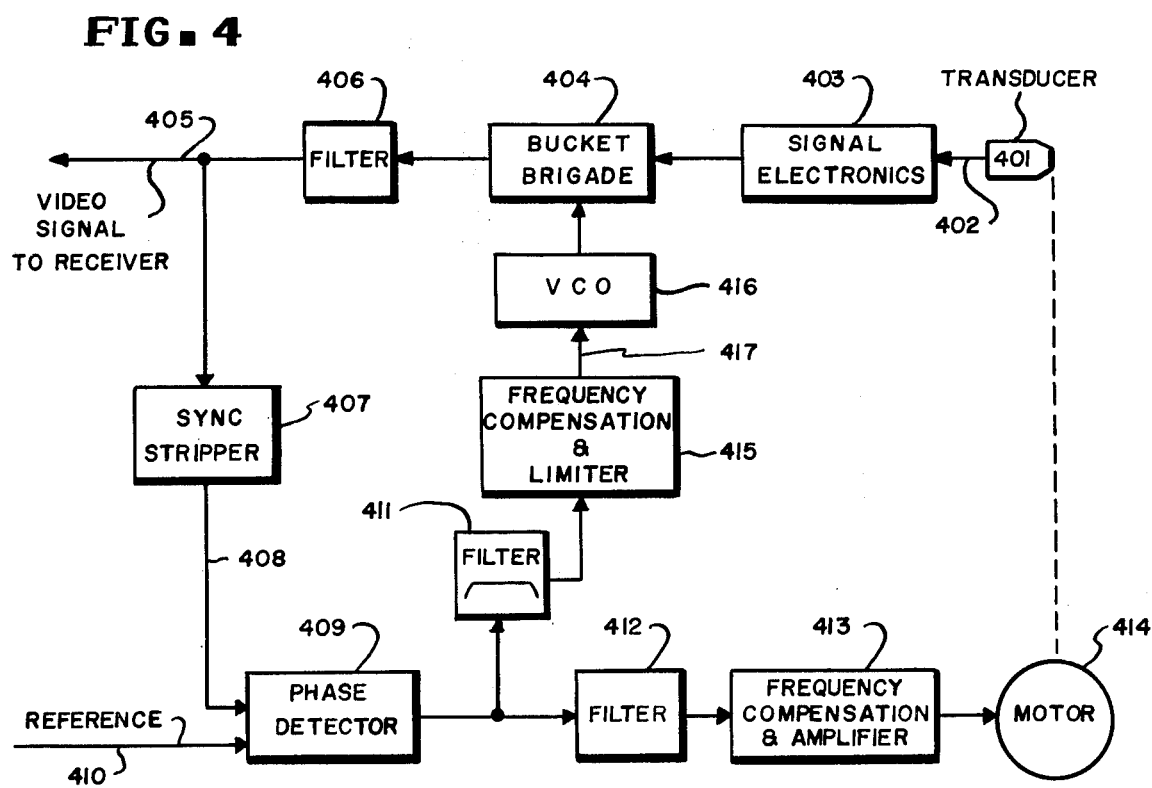
FIG. 4 is an embodiment using both electro-mechanical and electronic means of reducing time base error but with fewer components.

A fourth embodiment of this invention is shown in FIG. 4. FIG. 4 is in many respects similar to the time base error correction circuit shown in FIG. 3. However, FIG. 4 has the advantage of utilizing only a single sync stripper and a single phase detector network; therefore, the cost of manufacturing is reduced. In FIG. 4 the signal is picked up by transducer 401 as a video signal 402 and passed into signal electronics 403. The output of signal electronics 403 passes through bucket brigade delay 404 and low pass filter 406 as signal 405 which goes to the video receiver. A portion of signal 405 passes through the feedback loop sync stripper 407 which separates the video information from the horizontal synchronizing pulses and generates a horizontal synchronizing pulse signal 408 as an output. This signal 408 passes into phase detector 409 along with reference signal 410. Any phase difference between signal 408 and signal 410 results in an output of the phase detector 409 which output goes to filters 411 and 412. Filter 412 is a low frequency band pass filter. The output of filter 412 passes into frequency compensation and amplifier circuit 413 and is used to drive motor 414 to correct for low frequency time base error. The servo loop comprising elements 401, 403, 404, 406, 407, 409, 412, 413 and 414 has a bandwidth of approximately 80 Hz and, hence, can reduce low frequency time base error in the range up to 80 Hz.

Figure 6:
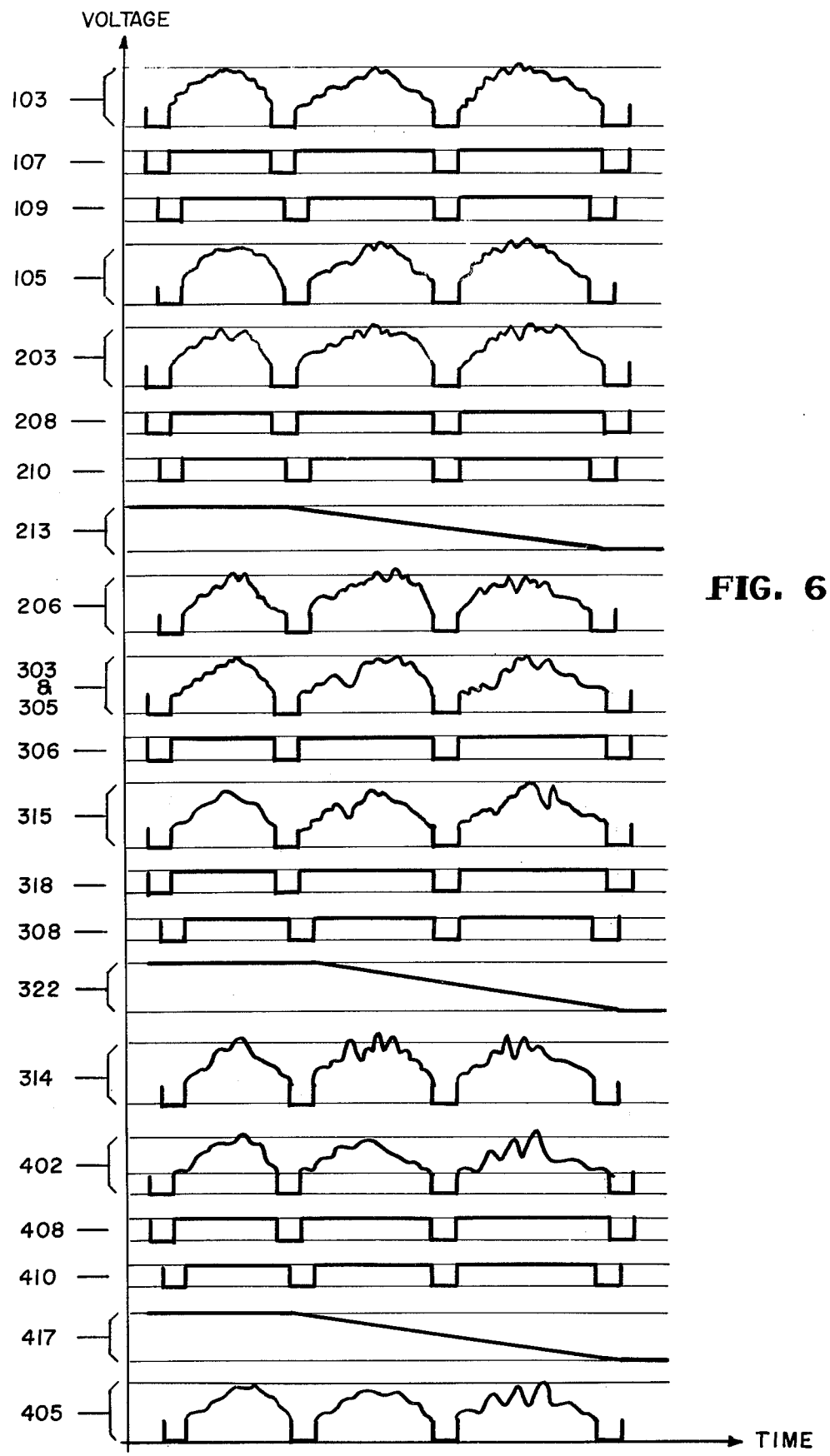
FIG. 6 is a chart showing the various signals occurring in FIGS. 1 through 4 aligned with respect to the time axis. The magnitudes of these signals are not to scale. Time base error is represented by the phase difference between the various signals and their respective reference signal.

High frequency time base error is corrected through the other feedback loop of the system. Time base error having frequencies between approximately 5 Hz and 2,500 Hz passes through band pass filter 411 and into frequency compensation and limiter circuit 415 where it is used to drive, by means of signal 417, the voltage controlled oscillator 416 which in turn triggers the electronic switches of bucket brigade delay line 404. The limiter portion of circuit 415 prevents the VCO 416 from being overdriven and assures a switching frequency to the bucket brigade 404 in the range of 6 to 12 mHz. This keeps the bucket brigade 404 operating even though no error signal is received. This portion of the circuit causes the higher frequency time base error, i.e. time base error having frequencies of 80 Hz. to 2,500 Hz, to be corrected for by bucket brigade 404. Therefore, the output signal 405 is a signal of such a low time base error that the television picture shown on the video receiver will be of high quality and free of objectional distortion. The various signals or pulse forms appearing in the circuits of FIGS. 1 to 4 have been separately shown in the chart of FIG. 6 where they are aligned with respect to the time axis so that the time base error is represented in FIG. 6 as the phase difference between the various signals and their corresponding reference signal. In view of the descriptions given above in connection with FIGS. 1 to 4, no further explanation of the chart, FIG. 6, is required.

Figure 5:
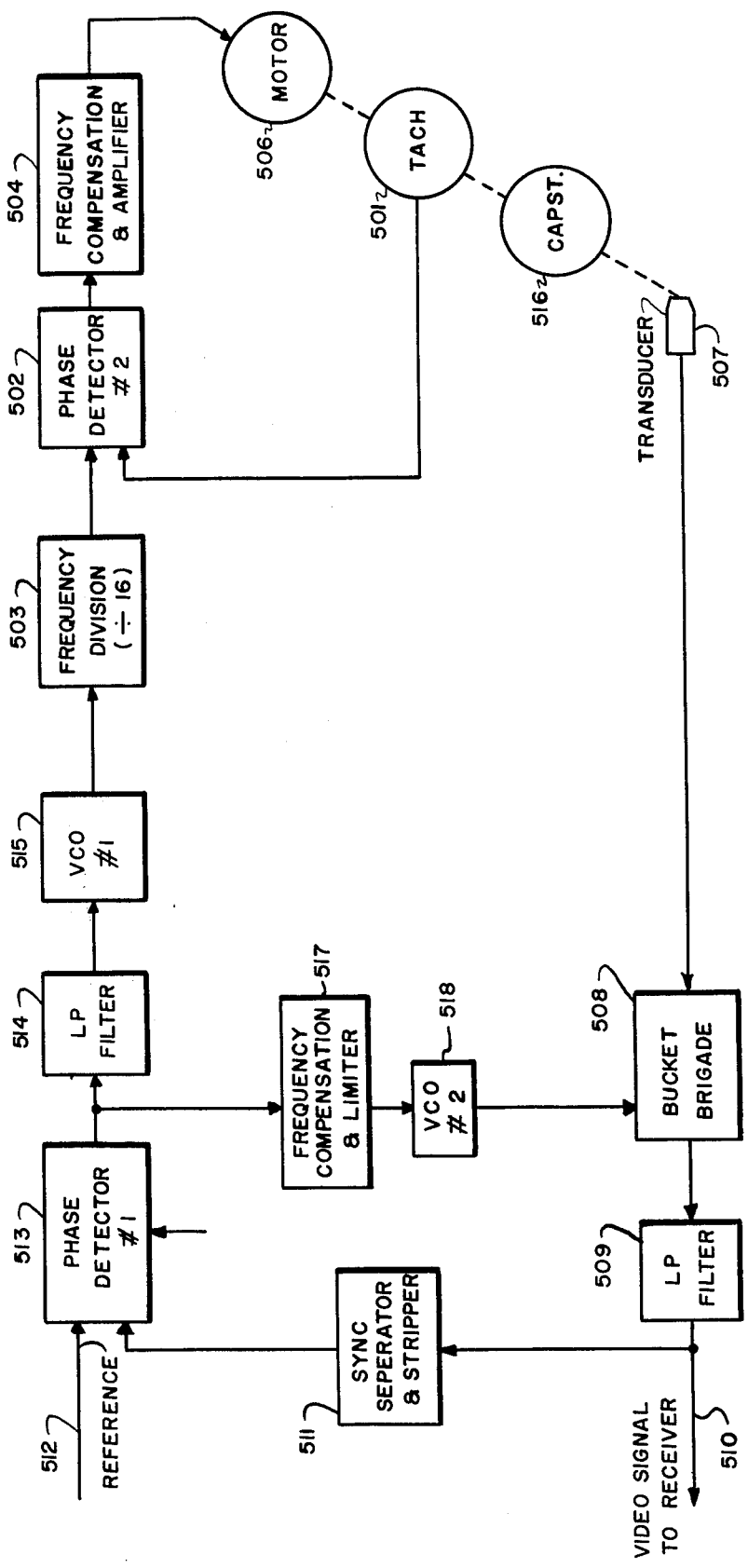
FIG. 5 is an additional embodiment using both electro-mechanical and electronic means of reducing time base error but with greater stability.

A fifth embodiment of this invention is shown in FIG. 5. FIG. 5 is in many respects similar to the time base error correction shown in FIG. 4 except for the addition of a tachometer loop. The embodiment shown in FIG. 5 includes three separate feedback loops. The first loop consists of tachometer 501, which generates feedback signals, and phase detector 502. Phase detector 502 compares the feedback signal generated by tachometer 501 with a reference signal coming from the frequency division circuit 503. The output of phase detector 502 is utilized to control the frequency compensation and amplifier circuit 504, which in turn controls the tape drive motor 506. In this preferred embodiment, this loop has a bandwidth of from 0 to 200 Hz, and functions to insure that the capstan angular velocity is constant, and reduces time base error resulting from torque disturbances.

The second loop utilizes transducer 507 which picks up the signal from the magnetic recording. This signal is passed through bucket brigade 508 and low pass filter 509. The low pass filter 509 functions to eliminate high frequency switching transients resulting from bucket brigade 508. The video to the receiver is taken off at point 510. The output from low pass filter 509 is presented to sync stripper 511 where the horizontal synchronizing pulses are separated from the balance of the video signal as previously discussed. The output of sync stripper 511 is compared with reference signal 512 in phase detector 513. Time base error in the signal from sync stripper 511 passes into low pass filter 514, which transmits in the range of zero to 40 Hz. The low frequency time base error passed by low filter 514 is utilized to operate the voltage-controlled oscillator 515 as previously described. The output of VCO 515 is divided by frequency division circuit 503, and is used for the reference frequency to phase detector 502. The tape locked loop 2 has a bandwidth of approximately 25 Hz, and, with VCO 515 providing an output frequency of 255 kHz ± 2 percent and circuit 503 dividing this frequency by 16, it insures that the average horizontal synchronizing pulse frequency from the magnetic recording is exactly 15.625 kHz. This portion of the circuit reduces the time base error which results from the once and twice around rotation of the capstan 516 and its satellites (not shown). This loop allows the VCO 515 to deviate from its established frequency by plus or minus 2 per cent. VCO 515 also has a limiter circuit at its input as previously described. While the use of the 255 kHz ± 2 percent VCO 515 in conjunction with frequency divider circuit 503 is the preferred embodiment, it would also be possible to use a VCO with an output frequency of 15.625 kHz directly, in which case the frequency divider 503 would be eliminated.

In the third feedback loop, the signal from transducer 507 passes through bucket brigade 508, low pass filter 509 sync stripper 511, phase detector 513, and into frequency compensation and limiter circuit 517. The frequency compensation and limiter circuit 517 operates as previously described to control the output of VCO 518, which in turn controls the switching frequency of bucket brigade 508. This feedback loop, the filter means of which have not been specifically shown in FIG. 5, has a bandwidth of from 5 Hz to 3 kHz, and serves to reduce the remaining high frequency time base error.

By way of summary then it will be appreciated that the three loops shown in FIG. 3 have the following complementary properties and functions: the first loop which is derived from the tachometer is a relatively wideband loop (approximately 200 Hz) and is thus able to pass also relatively high-frequency variations in motor speed. Hence, it is designed to hold the motor speed constant in the face of both high and low frequency variations in the speed of the motor. It may be looked at as a coarse adjustment means. The second loop which is derived from the magnetic head passes only low-frequency components and, as a consequence, corrects for low frequency speed variations of the motor; higher frequency components picked up by the magnetic head as a result of dropout and noise on the tape are not passed by the loop filter and hence have no effect on motor speed. This second loop, therefore, performs something in the nature of a fine adjustment in that it corrects the long-time average of the synchronizing pulses themselves, thereby correcting changes in pulse frequency that may result from factors other than motor speed variations, such as, for example, tape stretching, tension changes and the like. The third loop which controls the bucket brigade has a bandwidth (say 5 Hz – 3 kHz) which is larger yet than that of the first loop and it serves to correct high frequency variations which result from motor speed related disturbances such as high frequency variations in tape tension.

As a result this embodiment is advantageous in that a wide band servo system has been developed without many of the problems associated with such systems. More particularly, by the use of the tachometer lock loop, the first loop described above, a wide-band electro-mechanical servo has been provided which reduces the effects of friction; a tape lock loop of comparable bandwidth would not be possible, particularly because of the drop-out problem. Furthermore, since VCO 515 can deviate only by ± 2 percent from center frequency, the system shown in FIG. 5 will run smoothly, that is, without excessive acceleration or deceleration, even though the off-tape signal is extremely poor or non-existent. Thus, this embodiment is insensitive to dropouts, i.e., loss of one or more horizontal synchronizing pulses; therefore, magnetic tapes which are old and will generate numerous dropouts during playback can be utilized on a system incorporating this embodiment.

The embodiments discussed in this description are offered only as examples of this invention and are in no way meant to limit the scope of the invention. For example, while the invention has been described with particular reference to video recording it should be understood that the invention is also applicable to other systems, including data processing systems; that is, it applies to the correction of time base error not only in video signals but also in other kinds of signals that include both information components—such as, for instance, data intelligence—and time base or synchronizing pulses, and which are taken off a driven recording medium.

We claim:
1. A circuit arrangement for the correction of time base error in a video signal taken off a recording medium moved by a drive motor at variable speed, said video signal including both information components and time base pulses, said arrangement comprising:
   a separator for separating the time base pulses from the information components in the video signal taken off said recording medium, to provide a first feedback signal;
   generator means responsive to the rate of rotation of said motor for generating a second feedback signal; and
   a source for generating a reference pulse signal;
   wherein there are provided first and second comparison circuits;
   said first comparison circuit being connected to compare said first feedback signal including said time base pulses with the reference pulse signal;
   circuit connections impressing the output of said first comparison circuit as a reference signal on said second comparison circuit, said second comparison circuit being connected to compare the second feedback signal with the output of the first comparison circuit; and
   circuit means connected to the output of the second comparison circuit for altering the speed of rotation of said drive motor, thereby to vary the speed of said recording medium.

2. A circuit arrangement as claimed in claim 1, wherein there is provided a delay line connected to and controlled by the output of the first comparison circuit, said first-mentioned signal passing through said delay line.

3. A circuit arrangement, using multiple feedback loops, for the correction of time base error in a signal taken off a recording medium moved by a drive system, said signal including both information components and time base pulses, said arrangement comprising:
   a. means transducing the signal on the recording medium;
   b. a delay line element through which the transduced signal is passed.

c. circuit means separating the time base pulses from the balance of the transduced signal;
d. first and second phase detectors;
e. said first phase detector being connected to compare the frequency of the time base pulses with a first reference frequency to develop an error signal related to the time base error;
f. a first oscillator controlled by the error signal, the output of said oscillator providing a second reference frequency for said second phase detector;
g. means generating a feedback signal related to the rate of rotation of said drive system, said second phase detector being connected to compare the generated feedback signal with the second reference frequency;
h. circuit means connected to the output of the second phase detector to control the rate of rotation of said drive system; and
i. a second oscillator connected to and controlled by the output of the first phase detector, the output of said oscillator controlling the delay line element.

4. A circuit arrangement as claimed in claim 3, and also comprising means including said feedback signal generating means and said second phase detector, for providing a loop of a bandwidth sufficiently large to hold the rotational speed of said drive system substantially constant in the face of both low frequency and high frequency variations of said system.

5. A circuit arrangement as claimed in claim 4, and also comprising means including said transducing means and said first and second phase detectors, for providing a loop of a cutoff frequency sufficiently low to correct the long-time average of said time base pulses as well as aid in correcting low frequency speed variations of said drive system, without being substantially affected by dropout.

6. A circuit arrangement as claimed in claim 5, and also comprising means including said oscillator controlling the delay line element, for providing a loop of a bandwidth which is yet larger than that of the first mentioned loop and sufficient to correct high frequency time base pulse variations resulting from disturbances not related to the speed of the drive system.

* * * * *